Patented Feb. 21, 1933

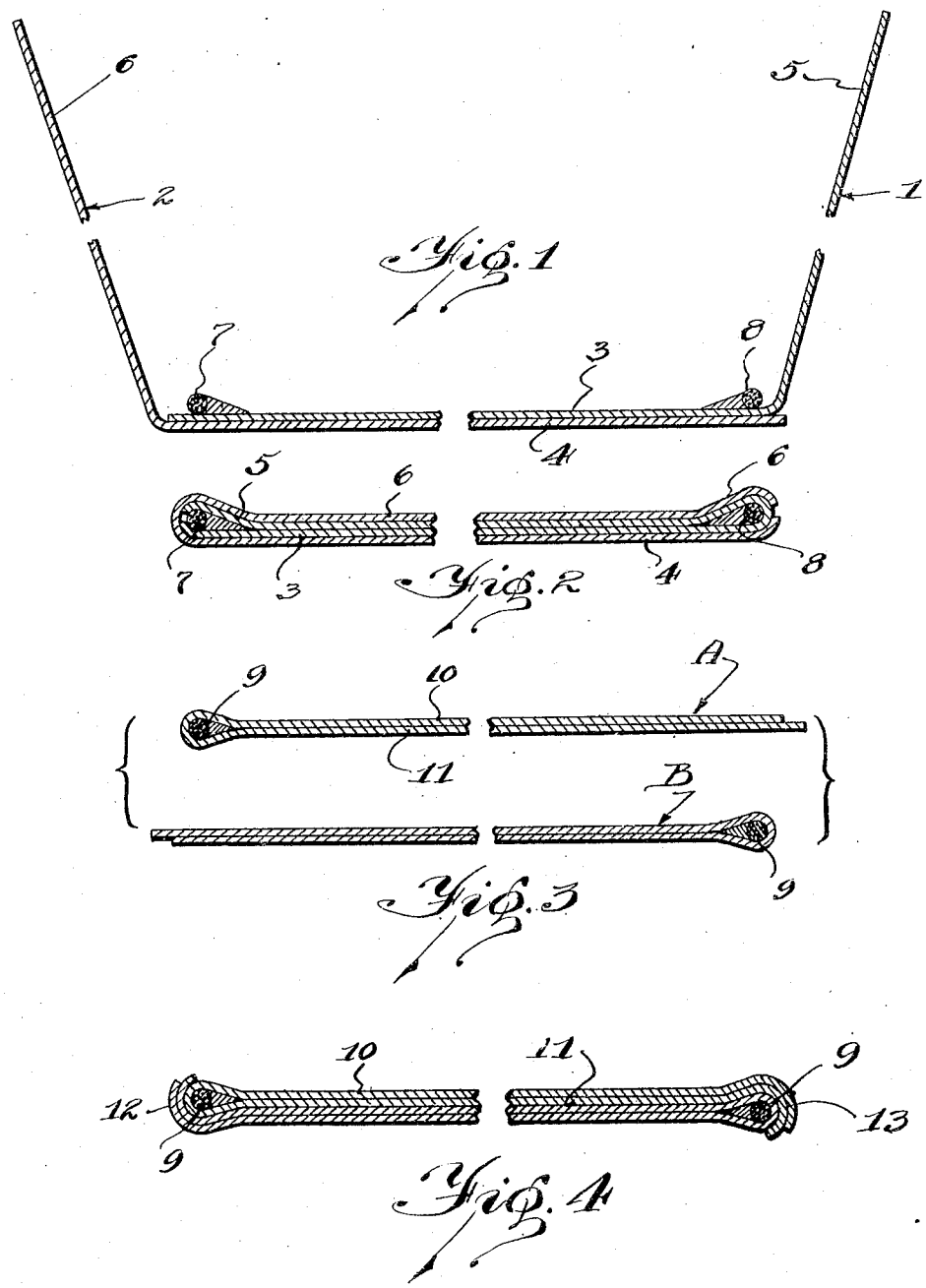

1,898,886

UNITED STATES PATENT OFFICE

ROY C. MURPHY, OF GRAND RAPIDS, MICHIGAN

PNEUMATIC TIRE AND METHOD OF FABRICATING SAME

Application filed April 22, 1929. Serial No. 356,906.

The invention relates to a pneumatitc tire and method of fabricating same, and has to do particularly with a novel manner of building up the plies of cord fabric preparatory to shaping and vulcanizing the tire casing.

In building up the plies of cord fabric in the fabrication of pneumatic tires, it is customary to first wind two plies of cord fabric around a flat or semi-flat form. The beads are then set in having been first covered with a "flipper" strip. After the edges of the first and second plies have been turned up over the beads, the additional plies are then laid on top of the first plies and their edges turned down over the bead and trimmed off. This is the standard method of forming the plies of cord fabric, but other attempts have been made to form and build up the plies in different ways, one of which includes the idea of placing plies of extra width one on top of the other and then folding them over so that the circumferential edges meet or overlap at the center of the tire. This latter form has proven very objectionable because, in addition to unbalancing and stiffening the tire casing, the joint is positioned at the point of greatest flexing and thus requires a gum strip to prevent breaking apart.

The present invention contemplates a novel and extremely simple method of initially building up the fabric to form a casing in that the strips of cord fabric are cut approximately double the standard width and folded over one upon the other, whereby to completely eliminate "flippers" and gum strips. Each bead is surrounded by at least one continuous layer of cord fabric and the edges of each layer of fabric terminate at the beads. This method of fabricating or building up the casing presents a final article which retains the beneficial points of the standard casing now produced but which is much cheaper in assembly, eliminates various operations and material, and presents a very efficient article.

In the drawing:

Fig. 1 is a diagrammatic view illustrating the first step in the preferred form of my process.

Fig. 2 is a diagrammatic sectional view illustrating the second step in the process wherein the opposite ends of the two layers of fabric are folded over to completely enclose the beads and to terminate at points adjacent the opposite beads.

Fig. 3 is a diagrammatic view of the first step in a modified form of my novel invention wherein the beads are enclosed by separate folded strips of fabric prior to assembly.

Fig. 4 is a view illustrating the method of assembling and joining the separate strips shown in Fig. 3.

The present invention relates to the formation and building up the cord fabric base of the casing, and while I have diagrammatically illustrated my invention by showing the steps of building up the layers of fabric on a flat form, it will be understood that such layers may be built up on various shapes and sizes of forms. In the drawing I have not shown the band or drum, as any standard article may be used on which to build or wind the fabric, but instead I have merely diagrammatically illustrated the steps of forming, positioning, and assembling the fabric strips to build up the tire base or carcass.

Instead of cutting the strips of fabric to the required width of the base, I preferably take two or more strips of fabric 1 and 2 which are approximately twice the width of the base or, in other words, twice the width of the standard layer of cord fabric. These double width layers of fabric are then placed or wound on the form so that one-half of each layer overlaps the other, as best shown in Fig. 1.

The halves of each strip which are first wound or placed on the form may be designated 3 and 4 and the remaining half of each strip designated 5 and 6, respectively. While the halves 3 and 4 are being placed one upon the other, the other halves 5 and 6 may be supported as shown in any suitable manner. Having once folded over the halves 3 and 4 the wires forming the beads 7 and 8 are next preferably wound directly on the carcass bead and at points adjacent the center portion of each single fabric strip 1 and 2, as best shown in Fig. 1.

The bead, of course, may be wound and formed separately, as is the present custom, and then set over the cord fabric, but regardless of the method of applying the bead it will be obvious that no "flipper" strip is required for the reason that after the bead has been wound and placed in position, as shown in Fig. 1, the other halves 5 and 6 of the two layers of fabric are then folded over whereby the half 5 of the one layer is folded completely around the bead 8 and terminates adjacent the bead 7, and the half 6 folds completely around the bead 7 and terminates adjacent the bead 8. The ends of each strip 1 and 2, are of course, folded around the beads, as shown, whereby the base or carcass is then ready for final forming and the standard successive steps of expansion and vulcanization.

In Figs. 3 and 4 I have shown a slightly modified form of assembling my novel fabric structure. In this modification only one width of fabric is handled at a time, that is, each strip of fabric is of double width the same as that used in the preferred form, as shown in Figs. 1 and 2, but is first folded over a single bead 9 to form two plies of fabric 10 and 11. Any number of these separate individual strips, such as shown at A in Figs. 3, may be formed, and by merely reversing one of these strips as shown at B, it will be obvious that two alternately positioned strips or units A and B may be then assembled and pressed together to form a four-ply carcass or base, as shown in Fig. 4. Having pressed or built up the two separate strips of fabric A and B, the ends of each strip are pressed or folded around the beads as shown at 12 and 13 in Fig. 4, preparatory to the final forming of the casing in the usual manner.

It will then be seen that I have provided an improved and extremely simple method of assembling a tire base or carcass whereby some of the cutting operations are reduced in half and the operator is enabled to wind the bead on the carcass at the time of assembly. This not only makes for an improved and more simple bead design, but also provides a casing which is well balanced. In both forms of my invention, as shown, one of the most important features is the folding over of a double width of fabric over a bead so that each bead is completely enclosed by a continuous length of fabric, and whereby all joints are made at the opposite bead. Thus, in addition to completely eliminating the use of a "flipper" strip or bead cover, I have also provided a base wherein the fabric layers are uniform and contiguous from bead to bead, the ends of each double width strip terminating in every instance adjacent opposite beads which is the logical point to terminate the circumferential joints or edges of the strips of fabric.

It will be understood that any number of plies of fabric may be added according to the type of the casing being formed, the circumferential edges of each added strip, whether single or double, being preferably wound or placed so as to terminate adjacent the beads.

What I claim is:

1. The steps in the forming of a tire casing which comprise, the placing of a plurality of strips of cord fabric on a form, each strip of fabric being substantially twice the effective width of the form, applying beads and folding over each strip of fabric whereby each bead will be positioned circumferentially adjacent each outer edge of the form and centrally of a folded over strip of fabric.

2. The steps in the forming of a tire casing which comprise, the placing of a plurality of strips of cord fabric on a form, each strip of fabric being substantially twice the effective width of the form, applying beads and folding over each strip of fabric whereby each bead will be positioned circumferentially adjacent each outer edge of the form and centrally of a folded over strip of fabric, the layers of fabric between the beads being uniform and continuous from bead to bead and the ends of each folded over strip of fabric terminating adjacent the sides of the casing.

3. The steps in the forming of a tire casing which comprise, cutting strips of cord fabric so as to be substantially double the width of the carcass to be formed, applying substantially half of each strip to a form in such a manner that the circumferential center of each strip is adjacent one edge of the effective surface of the form, winding a bead on the form at a point adjacent said circumferential center of each strip and successively folding over the remaining half of each strip to complete the four-ply base of the tire carcass.

4. The steps in the forming of a tire casing which comprise, cutting strips of cord fabric so as to be substantially double the width of the carcass to be formed, applying substantially half of each strip to a form in such a manner that the circumferential center of each strip is adjacent one edge of the effective surface of the form, winding bead wire on the form to form a bead at a point adjacent said circumferential center of each strip and folding over the remaining half of each strip to complete the four-ply base of the tire carcass.

5. The steps in the forming of a tire casing which comprise, cutting strips of cord fabric so as to be substantially double the width of the carcass to be formed, applying one half of each strip to a form in such a manner that the longitudinal center of each strip is adjacent one edge of the effective surface of the form, winding a bead on the form at a point adjacent said longitudinal center of each strip and folding over the remaining half of each strip to complete the four-ply base of the tire carcass, the layers of fabric between said beads being uniform and continuous and the free ends of each strip terminating and being folded over the opposite bead.

6. A base or carcass for a pneumatic tire casing, formed of a plurality of plies formed of sheets of fabric, and bead strips positioned circumferentially around each edge of the carcass, two of said sheets of fabric being substantially twice the width of the carcass and oppositely positioned, and each of said two strips being folded to enclose one of said beads and having both of its edges terminating adjacent the opposite bead.

7. A cord fabric base or carcass for pneumatic tires consisting of two beads positioned at opposite circumferential edges of said base, and a plurality of plies of cord fabric formed of sheets of fabric of a width approximately double the width of the carcass, said plies extending uniformly and continuous between said beads, each one of said beads being enclosed by at least one layer of fabric whereby to eliminate the use of a "flipper" strip.

8. The process of constructing a tire by the flat band method consisting in cutting two layers of fabric of a width substantially twice the width of a ply in the finished carcass, wrapping said layers about a drum, half the width of one layer overlapping half the width of the other to form a band having two ply thicknesses in the center and single ply thicknesses on each side of substantially the same width as the center two ply thickness, applying beads at each edge of the two ply portions of the layers, and folding the wings of the layers over the beads from opposite directions whereby four plies of fabric are obtained for the entire width of the tire, only one thickness of fabric enclosing the bead at each side of the tire.

In testimony whereof I affix my signature.

ROY C. MURPHY.